United States Patent
Kaneko et al.

(10) Patent No.: US 8,109,204 B2
(45) Date of Patent: Feb. 7, 2012

(54) STEAM COOKER AND STEAM GENERATOR

(75) Inventors: Fuminori Kaneko, Habikino (JP);
Yoshikazu Yamamoto, Kadoma (JP);
Masato Nakatani, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 538 days.

(21) Appl. No.: 10/590,717

(22) PCT Filed: Feb. 23, 2005

(86) PCT No.: PCT/JP2005/002870
§ 371 (c)(1),
(2), (4) Date: May 21, 2008

(87) PCT Pub. No.: WO2005/083328
PCT Pub. Date: Sep. 9, 2005

(65) Prior Publication Data
US 2008/0229936 A1    Sep. 25, 2008

(30) Foreign Application Priority Data

Feb. 27, 2004    (JP) ............................... P2004-053646

(51) Int. Cl.
*G07F 9/10*    (2006.01)
*A01G 13/06*    (2006.01)

(52) U.S. Cl. ......................................... 99/357; 392/386

(58) Field of Classification Search ................... 99/357, 99/358, 359; 219/386–406; 392/386–406
See application file for complete search history.

(56) References Cited

U.S. PATENT DOCUMENTS

| | | | | |
|---|---|---|---|---|
| 5,400,701 A | * | 3/1995 | Sham | 99/410 |
| 5,458,050 A | * | 10/1995 | Su | 99/340 |
| 5,479,707 A | * | 1/1996 | Alvarez et al. | 29/890.039 |
| 6,232,587 B1 | | 5/2001 | Kurita et al. | |
| 6,310,322 B1 | * | 10/2001 | Yang et al. | 219/386 |
| 6,389,959 B1 | * | 5/2002 | Robertson | 99/331 |

FOREIGN PATENT DOCUMENTS

| | | |
|---|---|---|
| JP | 56-168758 U | 5/1981 |
| JP | 60-44701 A | 3/1985 |
| JP | 60-95522 U | 6/1985 |
| JP | 8-49854 A | 2/1996 |
| JP | 10-110903 A | 4/1998 |
| JP | 2000-266302 A | 9/2000 |
| JP | 2002-153380 A | 5/2002 |
| JP | 2003-50151 A | 2/2003 |

* cited by examiner

*Primary Examiner* — Daniel L Robinson
(74) *Attorney, Agent, or Firm* — Birch, Stewart, Kolasch & Birch, LLP

(57) ABSTRACT

A steam cooker includes a steam generator for generating steam, a steam temperature-raising device for raising a temperature of steam coming from the steam generator, and a heating chamber in which an object to be cooked is heated by steam supplied from the steam temperature-raising device. The steam generator has a pot (41) to which water is supplied, a heater (42) placed in the pot (41), a water level sensor (43) and a temperature sensor (48) placed in the pot (41). The water level sensor (43) and the temperature sensor (48) are placed at opposed side surfaces in the pot (41) that correspond to the short sides of an elongated roughly rectangular planar shape of the pot (41). An exposed state of the heater (42) from the water in the pot (41) is judged by the water level sensor (43) and the temperature sensor (48).

12 Claims, 9 Drawing Sheets

Hsb : DISTANCE FROM HEATER BOTTOM TO PARTITION LOWER END
Hlow : WATER LEVEL AT WHICH WATER LEVEL SENSOR DECIDES THERE IS NO WATER
Hhi : MAX. WATER LEVEL
Hst : DISTANCE FROM HEATER BOTTOM TO PARTITION UPPER END

STEAM COOKER AND STEAM GENERATOR

BACKGROUND OF THE INVENTION

1. Field of Invention

This invention relates to a steam cooker and a steam generator.

2. Description of the Related Art

Heretofore, as a steam cooker for cooking an object to be cooked such as food by using steam, there is one that feeds superheated steam into an oven (for example, see JP 8-49854 A). This steam cooker has a steam generator in which a heater is provided along a perpendicular plane in a pot to generate steam, and a steam superheater that generates superheated steam by heating the steam generated by the steam generator, and the superheated steam generated by the steam superheater is sent into the oven to cook food.

In the conventional steam cooker, since a water level in the pot cannot accurately be detected due to air bubbles generated by boiling at the time of steam generation, the water level cannot be controlled at a position in the vicinity of an upper portion of the heater. Therefore, a large amount of water must be put into the pot before the water is heated. Thus, in the conventional steam cooker, it takes time for the steam generator to generate steam, so that the start of superheated steam generation cannot be quickened. Accordingly, cooking time gets longer compared with a microwave oven.

In the past, there was no steam generator suitable for applications in which quick start of steam generation is required.

SUMMARY OF THE INVENTION

An object of this invention is, therefore, to provide a steam cooker that can quicken the start of superheated steam generation and can reduce cooking time.

Another object of the invention is to provide a steam generator that can quicken the start of steam generation and is ideal for use in a device performing cooking such as a steam cooker.

In order to accomplish the above object, a steam cooker according to the present invention comprises a steam generator for generating steam, a steam temperature-raising device for raising a temperature of steam coming from the steam generator, and a heating chamber in which an object to be cooked is heated by steam supplied from the steam temperature-raising device. And, the steam generator includes a pot to which water is supplied, a heater placed in the pot, and a plurality of state judging devices placed in the pot and judging an exposed state of the heater from the water in the pot.

In the steam cooker with the above construction, a water level in the pot is set to a little higher position than that of the upper side of the heater, whereby the amount of water in the pot can be minimized. However, in the case where the body of the steam cooker is tilted and the pot is thus tilted as well, heat emitted from the heater cannot efficiently be used if the water level in the pot is such that the heater is exposed upward from a water surface, so that the start of steam generation is also delayed. In view of this, in the steam cooker of the invention, the plurality of state judging sensors for judging the exposed state of the heater are placed in the pot, whereby the exposed state of the heater from the water in the pot is judged. By doing so, based on the judgment results of the plurality of state judging devices, it becomes possible to keep the water level in the pot such that the heater is not exposed from the water surface in the pot. In this manner, even if the pot is tilted, exposure of the heater from the water surface is avoided, and at the same time the amount of water in the pot to be heated by the heater can be minimized. Therefore, the start of steam generation by the steam generator can be quickened. Furthermore, application of a thermal stress to peripheral members due to an increase in the temperature of the heater exposed from the water surface can be avoided, leading to an improvement in reliability.

Then, steam generated by the steam generator is raised in temperature by the steam temperature-raising device to give superheated steam, and the superheated steam is supplied into the heating chamber, whereby the object to be cooked in the heating chamber is heated. As apparent from the above, by quickening the start of steam generation by the steam generator, the start of superheated steam generation can be quickened, so that time required for cooking can be reduced.

In one embodiment, the pot of the steam generator has a planar shape of generally an elongated rectangle, and the plurality of state judging devices are placed at opposed side surfaces in the pot.

In the steam cooker of the embodiment, because the plurality of state judging devices are placed at opposed inner side surfaces of the pot whose planar shape (i.e., shape in plan view) is generally an elongated rectangle, the tilt of the pot along a perpendicular plane including a straight line connecting the state judging devices can be detected.

In one embodiment, the opposed side surfaces in the pot at which the plurality of state judging devices are placed correspond to short sides of the elongated rectangle of the pot.

In the steam cooker of the embodiment, because the plurality of state judging devices are placed at the opposed side surfaces of the pot that correspond to the short sides of the elongated rectangle shape of the pot, the straight line connecting the state judging devices corresponds to the longitudinal direction of the pot. Thus, it is possible to detect a tilt of the pot along the perpendicular plane including the straight line, which tilt is a greatest factor causing the exposure of the heater from the water surface.

In one embodiment, at least one of the plurality of state judging devices is a water level sensor.

In the steam cooker of the embodiment, the water level sensor is usable for both detecting the water level in the pot and judging the exposed state of the heater. Thus, by using the water level sensor for at least one of the plurality of state judging devices, the structure can be simplified.

In one embodiment, the water level sensor is a self-heating thermistor.

In the steam cooker of the embodiment, because the self-heating thermistor used as the water level sensor detects the water level utilizing a difference in heat radiation coefficient between in the water and in the air. Thus, unlike a float type water level sensor, the water level sensor has a simple structure with no movable portion and thus can accurately detect the water level. In the case of the embodiment, the water level sensor detects the temperature (steam temperature) not only in the water but also in the air at the time of steam generation during which a water temperature varies. Thus, it is preferable to use a temperature sensor for detecting a water temperature in combination with the water level sensor so that the presence or absence of water is judged based on the temperature detected by the self-heating thermistor and the water temperature detected by the temperature sensor.

A steam generator according to the present invention includes a pot to which water is supplied, a heater placed in the pot, and a plurality of state judging devices placed in the pot and judging an exposed state of the heater from the water in the pot.

In the steam generator with the above construction, a water level in the pot is set to a little higher position than that of the upper side of the heater, whereby the amount of water in the pot can be minimized. However, in the case where the body of the steam generator is tilted and the pot is thus tilted as well, heat emitted from the heater cannot efficiently be used if the water level in the pot is such that the heater is exposed upward from a water surface, so that the start of steam generation is also delayed. In view of this, in the steam generator of the invention, the plurality of state judging sensors for judging the exposed state of the heater are placed in the pot, whereby the exposed state of the heater from the water in the pot is judged. By doing so, based on the judgment results of the plurality of state judging devices, it becomes possible to keep the water level in the pot such that the heater is not exposed from the water surface in the pot. In this manner, even if the pot is tilted, exposure of the heater from the water surface is avoided, and at the same time the amount of water in the pot to be heated by the heater can be minimized. Therefore, the start of steam generation by the steam generator can be quickened. Furthermore, application of a thermal stress to peripheral members due to an increase in the temperature of the heater exposed from the water surface can be avoided, leading to an improvement in reliability.

In one embodiment, the pot has a planar shape of generally an elongated rectangle, and the plurality of state judging devices are placed at opposed side surfaces in the pot.

In the steam generator of the embodiment, because the plurality of state judging devices are placed at opposed inner side surfaces of the pot whose planar shape (i.e., shape in plan view) is generally an elongated rectangle, the tilt of the pot along a perpendicular plane including a straight line connecting the state judging devices can be detected.

In one embodiment, the opposed side surfaces in the pot at which the plurality of state judging devices are placed correspond to short sides of the elongated rectangle of the pot.

In the steam generator of the embodiment, because the plurality of state judging devices are placed at the opposed side surfaces of the pot that correspond to the short sides of the elongated rectangle shape of the pot, the straight line connecting the state judging devices corresponds to the longitudinal direction of the pot. Thus, it is possible to detect a tilt of the pot along the perpendicular plane including the straight line, which tilt is a greatest factor causing the exposure of the heater from the water surface.

In one embodiment, at least one of the plurality of state judging devices is a water level sensor.

In the steam generator of the embodiment, the water level sensor is usable for both detecting the water level in the pot and judging the exposed state of the heater. Thus, by using the water level sensor for at least one of the plurality of state judging devices, the structure can be simplified.

In one embodiment, the water level sensor is a self-heating thermistor.

In the steam generator of the embodiment, because the self-heating thermistor used as the water level sensor detects the water level utilizing a difference in heat radiation coefficient between in the water and in the air. Thus, unlike a float type water level sensor, the water level sensor has a simple structure with no movable portion and thus can accurately detect the water level. In the case of the embodiment, the water level sensor detects the temperature (steam temperature) not only in the water but also in the air at the time of steam generation during which a water temperature varies. Thus, it is preferable to use a temperature sensor for detecting a water temperature in combination with the water level sensor so that the presence or absence of water is judged based on the temperature detected by the self-heating thermistor and the water temperature detected by the temperature sensor.

As is apparent from the above, in the steam cooker of the invention, the start of superheated steam generation can be quickened, so that cooking time can be reduced.

Also, in the steam generator of the invention, the start of steam generation can be quickened. Thus a steam generator that is optimum for a device performing cooking such as a steam cooker is realized.

DETAILED DESCRIPTION OF THE INVENTION

Figure 1:
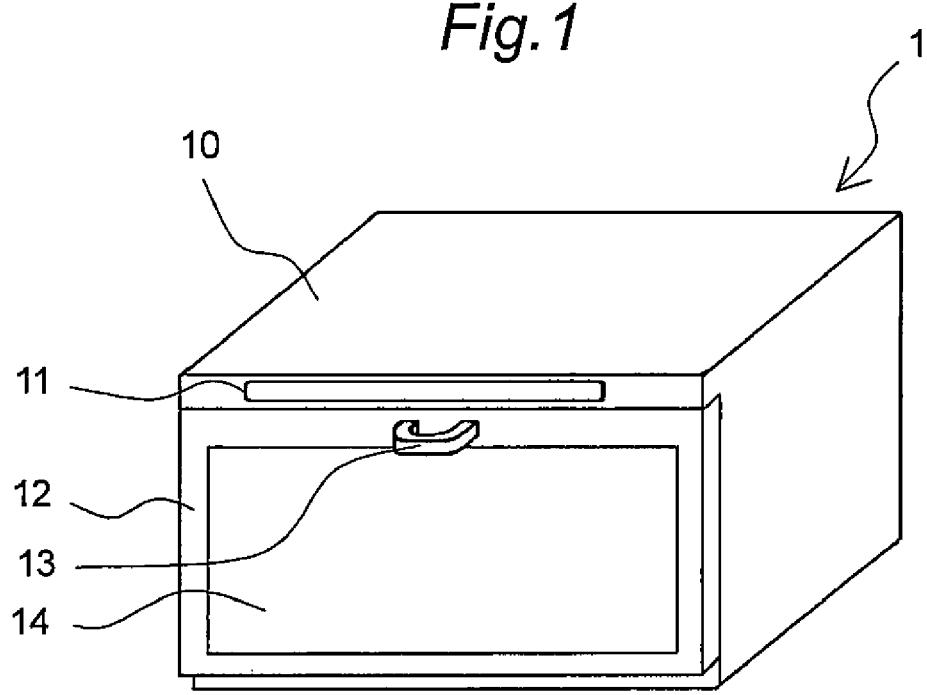
FIG. 1 is a perspective view showing an external appearance of a steam cooker according to one embodiment of the invention.

The steam cooker of the invention will be described using examples shown in the drawings.

FIG. 1 is an external perspective view of a steam cooker 1 according to one embodiment of the invention. In the steam cooker, a front upper portion of a rectangular parallelepiped cabinet 10 is provided with an operation panel 11, and a door 12, which is rotatable around a lower end side of the cabinet, is provided under the operation panel 11. An upper portion of the door 12 is provided with a handle 13, and the door 12 is provided with a window 14 made of thermal glass.

Figure 2:
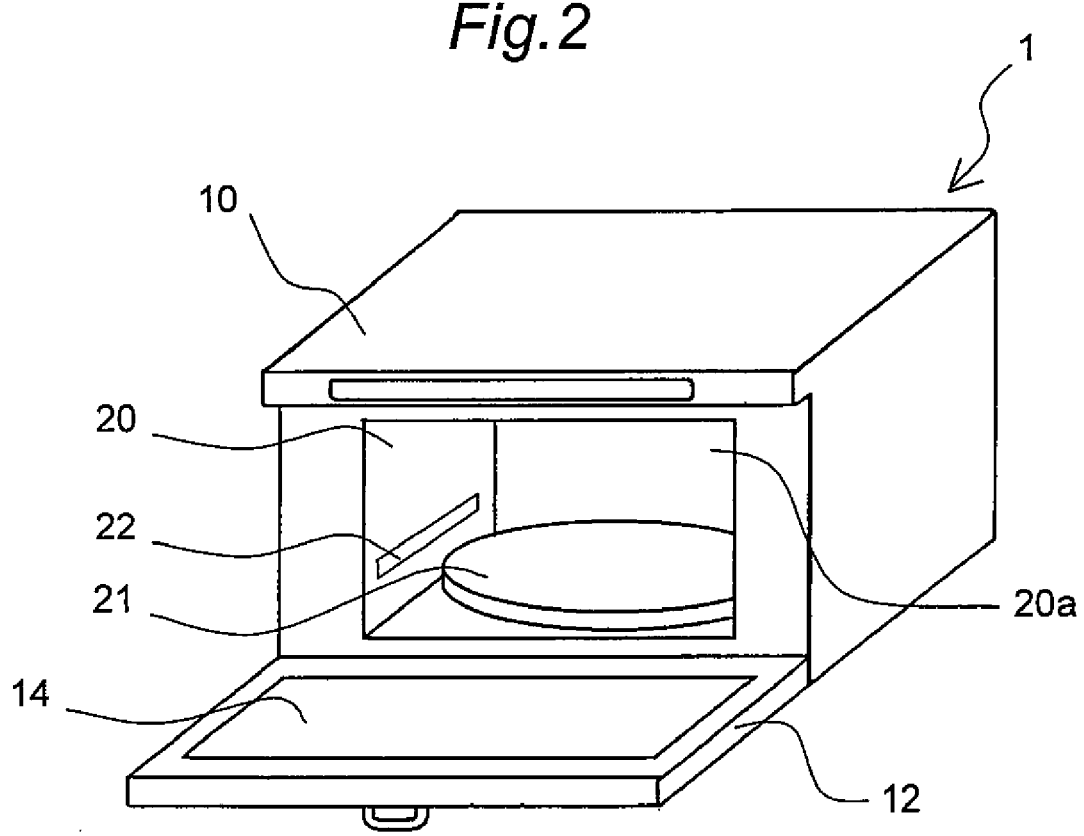
FIG. 2 is a perspective view showing an external appearance of the steam cooker with its door opened.

FIG. 2 is an external perspective view of the steam cooker 1 with the door 12 opened. A rectangular parallelepiped heating chamber 20 is provided in the cabinet 10. The heating chamber 20 has an opening 20$a$ on its front side facing the door 12, and side surfaces, a bottom surface and a top surface of the heating chamber 20 are formed of stainless steel plates. A side of the door 12 facing the heating chamber 20 is formed of a stainless steel plate. A heat insulator (not shown) is placed in the surrounding of the heating chamber 20 and the interior of the door 12 to insulate the inside of the heating chamber 20 from the outside.

A stainless steel-made catch pan 21 is placed at the bottom surface of the heating chamber 20, and a stainless steel wire-made rack 24 (shown in FIG. 3) for receiving an object to be cooked is placed on the catch pan 21. Further, side steam outlets 22, 22 of a roughly rectangular shape, which are longitudinally roughly level to each other (only one of the openings is shown in FIG. 2), are provided at both lateral side surfaces of the heating chamber 20.

Figure 3:
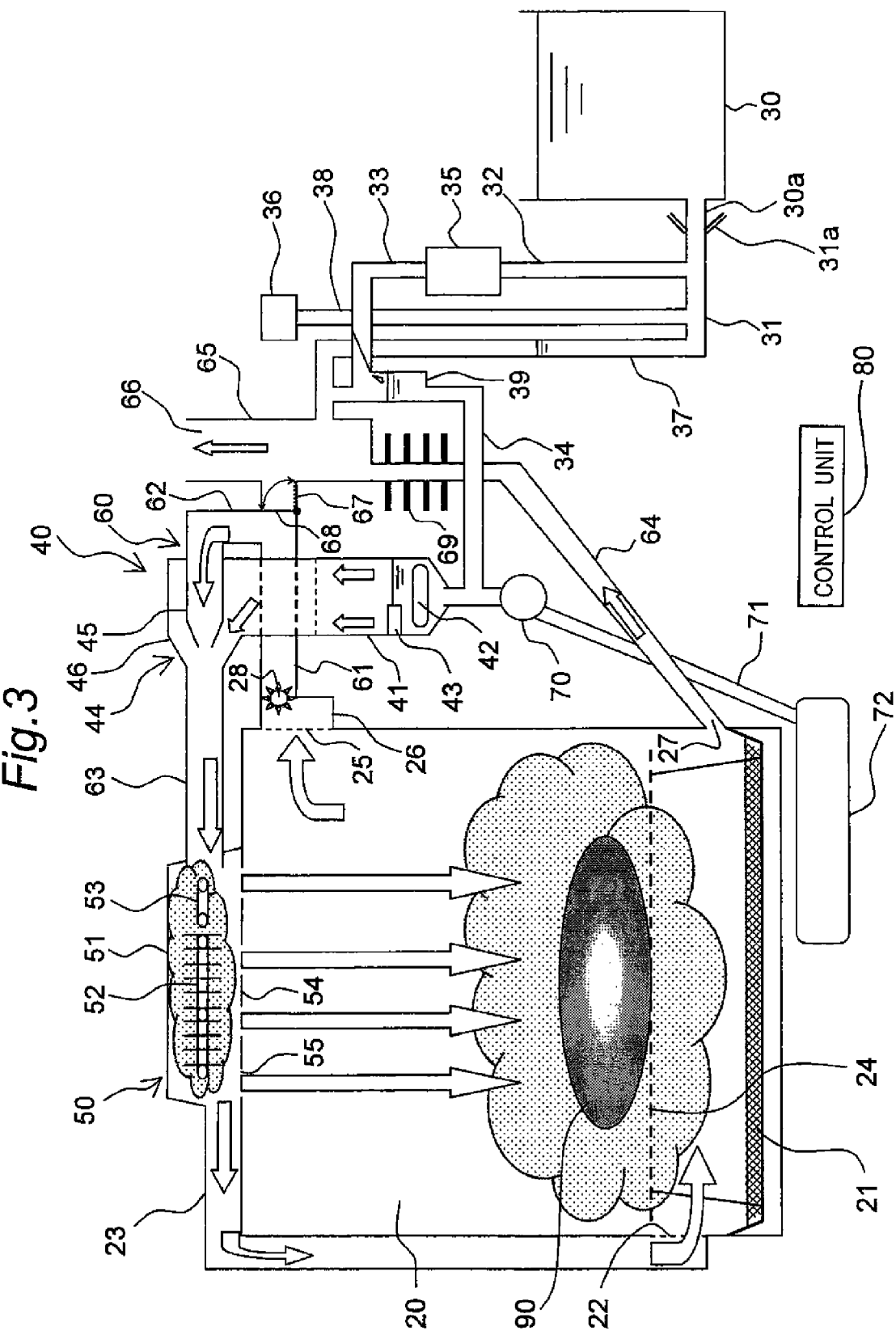
FIG. 3 is a schematic diagram showing the construction of the steam cooker.

FIG. 3 is a schematic view showing the basic construction of the steam cooker 1. As shown in FIG. 3, the steam cooker 1 includes the heating chamber 20, a water tank 30 for storing water for steam, a steam generator 40 for evaporating water supplied from the water tank 30, a steam temperature-raising device 50 for heating steam from the steam generator 40 and a control unit 80 for controlling the steam generator 40, the steam temperature-raising device 50 and other devices.

The lattice-like rack 24 is placed on the catch pan 21 placed in the heating chamber 20, and an object 90 to be cooked is placed at a roughly central portion of the rack 24.

A connecting portion 30*a* provided at the lower side of the water tank 30 is connected to a funnel-like receiving port 31*a* provided at one end of a first water supply pipe 31. The suction side of a pump 35 is connected to an end of a second water supply pipe 32, which branches off from the first water supply pipe 31 and extends upward, and one end of a third water supply pipe 33 is connected to the discharge side of the pump 35. A water level sensor 36 for the water tank is provided at an upper end portion of a pipe 38 for the water level sensor, which pipe branches off from the first water supply pipe 31 and extends upward. Further, an upper end portion of an air releasing pipe 37 that branches off from the first water supply pipe 31 and extends upward is connected to an exhaust gas duct 65.

The third water supply pipe 33 has an L shape that is bent roughly horizontally from a vertically placed portion and an auxiliary tank 39 is connected to the other end of the third water supply pipe 33. One end of a fourth water supply pipe 34 is connected to a lower end of the auxiliary tank 39, and the other end of the fourth water supply pipe 34 is connected to a lower end of the steam generator 40. One end of a drain valve 70 is connected to the lower end of the steam generator 40, to which the fourth water supply pipe 34 is connected at one end thereof. One end of a drain pipe 71 is connected to the other end of the drain valve 70, and a water drain tank 72 is connected to the other end of the drain pipe 71. An upper portion of the auxiliary tank 39 communicates with air via the air releasing pipe 37 and the exhaust gas duct 65.

Once the water tank 30 has been connected, water rises in the air releasing pipe 37 until its water level reaches the same water level as that of the water tank 30. Since a tip of the pipe 38 connected to the water level sensor 36 for the water tank is sealed, the water level in the pipe 38 does not rise, but a pressure in a sealed space in the pipe 38 for the water level sensor increases from an atmospheric pressure, depending on the water level of the water tank 30. This pressure change is detected by a pressure detection device (not shown) in the water level sensor 36 for the water tank, whereby the water level in the water tank 30 is detected. Although water level measurement does not require the air releasing pipe 37 while the pump 35 is stationary, the air releasing pipe 37 having an open end is used in order to prevent deterioration of accuracy in the detection of the water level due to direct application of a suction pressure of the pump 35 to the pressure detection device.

The steam generator 40 has a pot 41, to the lower side of which the other end of the fourth water supply pipe 34 is connected, a heater 42 placed in the vicinity of a bottom surface in the pot 41, a water level sensor 43 placed in the vicinity of the upper side of the heater 42 in the pot 41, and a steam suction ejector 44 attached to the upper side of the pot 41. A fan casing 26 is placed outside an intake opening 25 provided at an upper portion of a lateral side of the heating chamber 20. Steam in the heating chamber 20 is sucked through the intake opening 25 by a blower fan 28 placed in the fan casing 26. The sucked steam is sent to an inlet side of the steam suction ejector 44 via a first pipe 61 and a second pipe 62. The first pipe 61 is placed roughly horizontally, and its one end is connected to the fan casing 26. The second pipe 62 is roughly vertically placed, and its one end is connected to the other end of the first pipe 61, and the other end of the second pipe 62 is connected to the inlet side of an inner nozzle 45 of the steam suction ejector 44.

The steam suction ejector 44 is provided with an outer nozzle 46 that covers an outer side of the inner nozzle 45, and the discharge side of the inner nozzle 45 communicates with an internal space of the pot 41. The discharge side of the outer nozzle 46 of the steam suction ejector 44 is connected to one end of a third pipe 63 and a steam temperature-raising device is connected to the other end of the third pipe 63.

The fan casing 26, the first pipe 61, the second pipe 62, the steam suction ejector 44, the third pipe 63 and the steam temperature-raising device 50 form an external circulation passage 60. One end of a discharge passage 64 is connected to a discharge port 27 provided in a lower portion of the lateral side of the heating chamber 20, and the other end of the discharge passage 64 is connected to one end of the exhaust gas duct 65. The other end of the exhaust gas duct 65 is provided with an exhaust gas outlet 66. A radiator 69 is outwardly fitted to the exhaust gas duct 65 side of the discharge passage 64. A connection portion of the first pipe 61 and the second pipe 62 is connected to the exhaust gas duct 65 through an exhaust gas passage 67. At the connection side with the first and second pipes 61, 62, the exhaust gas passage 67 is provided with a damper 68 that opens/closes the exhaust gas passage 67.

The steam temperature-raising device 50 includes a tray-shaped case 51 placed with its opening downward on a ceiling side at a central portion of the heating chamber 20, a first steam superheater 52 placed in the tray-shaped case 51, and a second steam superheater 53 placed in the tray-shaped case 51. A bottom of the tray-shaped case 51 is formed of a metallic ceiling panel 54 serving as a ceiling plane of the heating chamber 20. The ceiling panel 54 is formed with a plurality of ceiling steam outlets 55. Both upper and lower surfaces of the ceiling panel 54 give a dark color by coating and the like. The ceiling panel 54 may also be formed of a metal material that turns into a dark color by repetitive use or a dark ceramic molded product.

One end of each of steam supply passages 23 (in FIG. 3, only one of them is shown), which extend to the left and right sides of the heating chamber 20, is individually connected to the steam temperature-raising device 50. The other end of each of the steam supply passages 23 extends downward along the side surfaces of the heating chamber 20 and is connected to side steam outlets 22, which are provided in a lower position of the lateral side of the heating chamber 20.

Next, the steam generator 40 will be described in detail with reference to FIGS. 4, 5.

Figure 4:
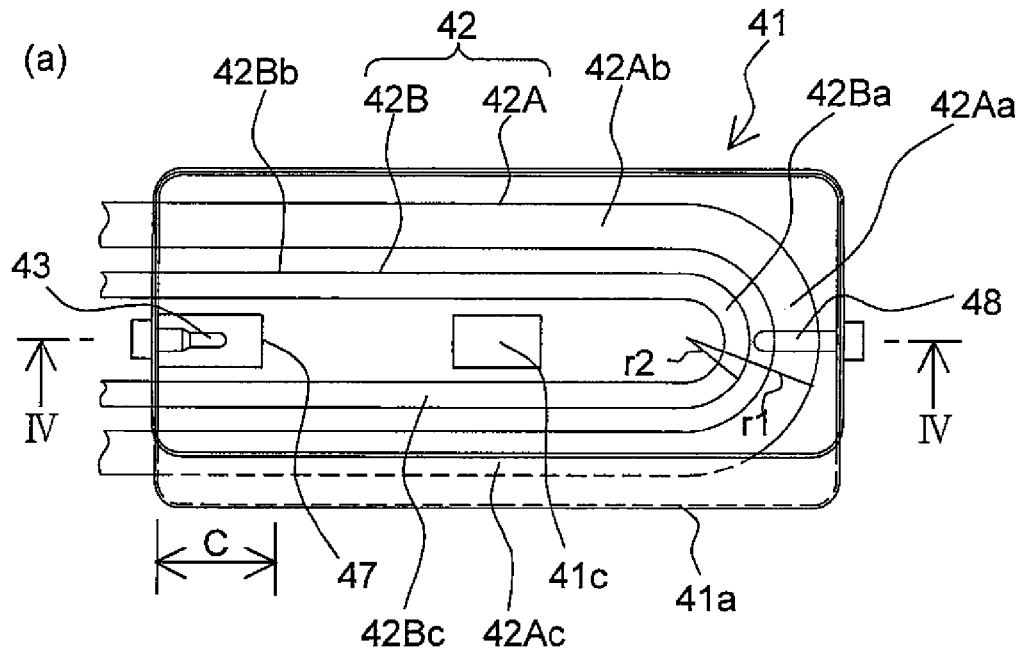
FIG. 4($a$) is a plan view of a pot of a steam generator of the steam cooker, and FIG. 4($b$) is a side view of the pot.
Figure 4:
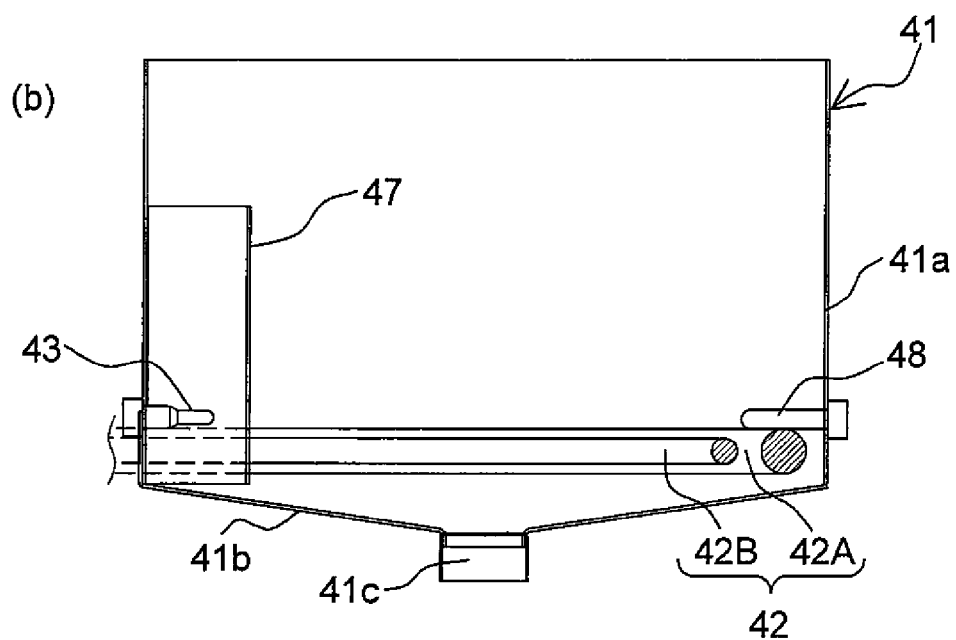
Figure 5:
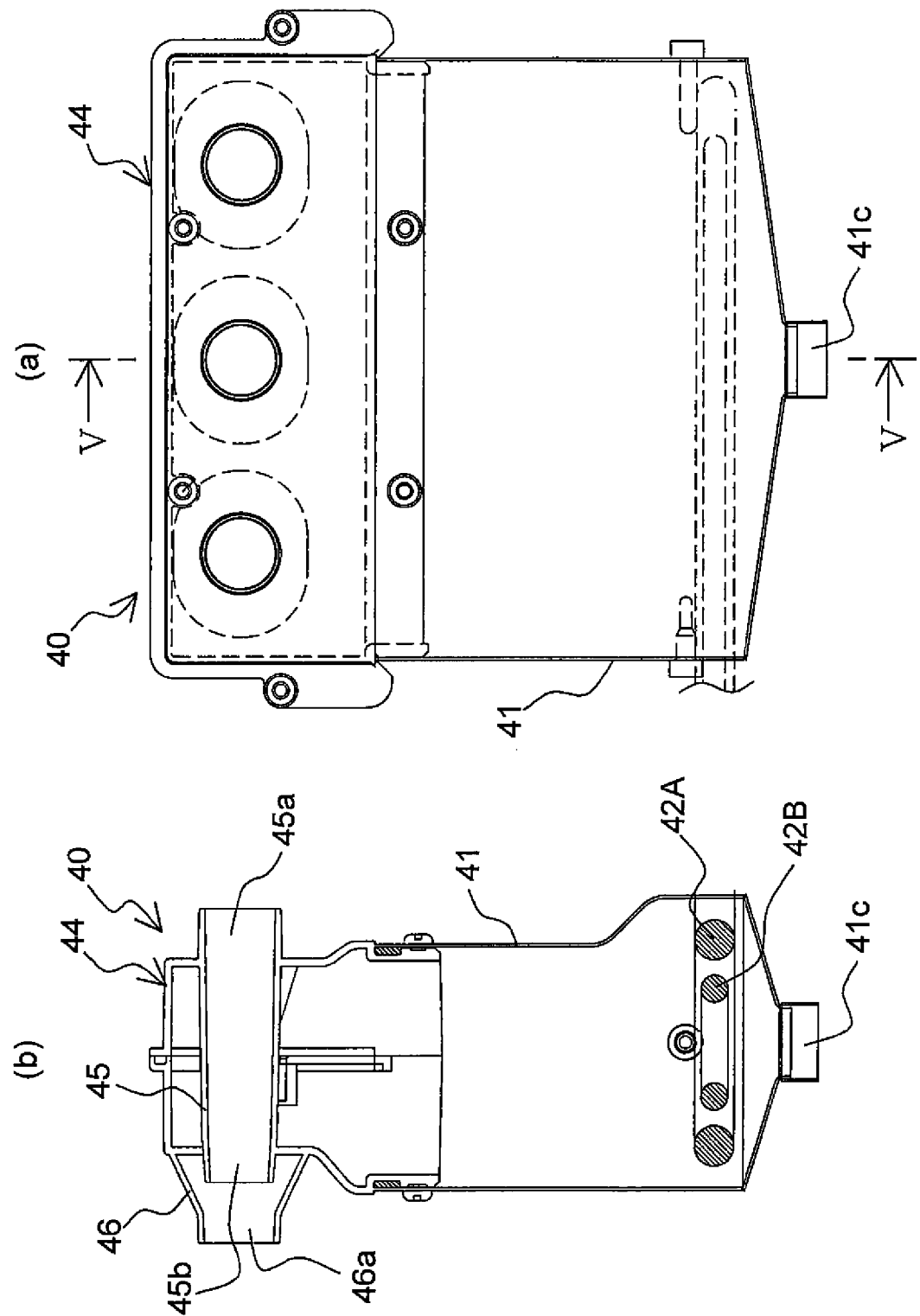
FIG. 5($a$) is a side view of the steam generator 40, and FIG. 5($b$) is a cross sectional view taken along line V-V of FIG. 5($a$)

First, FIG. 4(*a*) is a plan view, seen from above, of the pot 41 of the steam generator 40, and FIG. 4(*b*) is a side view of the pot 41.

As shown in FIGS. 4(*a*), (*b*), the pot 41 includes a cylinder portion 41*a* which has, in its horizontal plan view, a roughly rectangular shape, a bottom portion 41*b* provided on the lower side of the cylinder portion 41*a* and formed of an inclined plane that is gradually lowered toward a center portion of the bottom portion, and a water supply port 41*c* provided at a roughly center portion of the bottom portion 41*b*.

Although the vertical to horizontal ratio of the planar shape of the pot 41 is 1:2.5, what is required of the planar shape is that the planar shape is an elongated shape, namely a rectangular or elliptic shape. Preferably, however, the vertical to horizontal ratio in the case of the rectangular shape is 1:2, more preferably 1:2.5, and most preferably 1:3 or less.

The heater 42 is placed in the vicinity of the bottom portion 41b in the pot 41. The heater 42 is constructed of a first steam generation heater 42A that is a U-shaped sheath heater having a larger pipe diameter and a second steam generation heater 42B that is a U-shaped sheath heater having a smaller pipe diameter, which is placed inside the first steam generation heater 42A and roughly on the same plane as the first generation heater 42A. The heater 42 is placed adjacent to sidewalls of the cylinder portion 41a of the pot 41. A minimum distance between an outer edge of the heater 42 and the sidewalls of the cylinder portion 41a is set to 2 mm to 5 mm. A lowermost portion of the heater 42 is placed adjacent to the bottom portion 41b of the pot 41. A minimum distance between a lowermost portion of the heater 42 and the bottom portion 41b of the pot 41 is set to 2 mm to 5 mm.

In this embodiment, a 700 W sheath heater having a larger pipe size is used for the first steam generation heater 42A, while a 300 W sheath heater having a smaller pipe size is used for the second steam generation heater 42B. The first steam generation heater 42A has a curved portion 42Aa that has a roughly semicircular arc shape, and two linear portions 42Ab, 42Ac that extend roughly parallel from both ends of the curved portion 42Aa. The second steam generation heater 42B has a curved portion 42Ba that has a generally semicircular arc shape, and two linear portions 42Bb, 42Bc that extend roughly parallel from both ends of the curved portion 42Ba. The curved portion 42Aa of the first steam generation heater 42A has a minimum curvature radius r1, which is determined by the sheath heater having a larger pipe size to be used, while the curved portion 42Ba of the second steam generation heater 42B has a minimum curvature radius r2 (<r1), which is determined by the sheath heater having a smaller pipe size to be used.

A water level sensor 43 is placed in the vicinity of the upper side of the heater 42 in the pot. 41 and at a sidewall on the side of a non-heating portion (region C of FIG. 4(a)) inside the second steam generation heater 42B. In the pot 41, a partition plate 47 having a square cornered U-shape in cross section, which surrounds the water level sensor 43, is provided. The partition wall 47 and the sidewall in the pot 41 form a casing having a rectangular shape in cross section. A lower end of the partition plate 47 is located on the upper side of the bottom portion 41b of the pot 41 and beneath the lowermost portions of the first and second steam generation heaters 42A, 42B. On the other hand, an upper end of the partition plate 47 is set at a level that is twice or more of a height from the lowermost portion of the heater 42 to an attaching position of the water level sensor 43. Further, a temperature sensor 48 is placed at a sidewall opposite to the water level sensor 43 in the pot 41.

The water level sensor 43 is a self-heating thermistor. In water, a temperature ranging from about 100° C. to 140° C. is detected depending on a water temperature ranging from about 20° C. to 100° C., while, in air, a temperature ranging from about 140° C. to 150° C. is detected. Based on the water temperature detected by the temperature sensor 48, the temperature detected by the water level sensor 43 is determined, whereby the presence or absence of water, namely whether or not water is present at the attaching position of the water level sensor 43 is determined.

FIG. 5(a) is a side view of the steam generator 40, and FIG. 5(b) is a cross sectional view taken along line V-V of FIG. 5(a).

As shown in FIGS. 5(a), (b), the steam suction ejector 44 is attached in a manner so as to cover an upper side opening of the pot 41, which is internally provided with the first and second steam generation heaters 42A, 42B. A fluid (steam) flowing in from an inlet 45a of the inner nozzle 45 is discharged from the opening 45b of the inner nozzle 45 and then discharged from the opening 46a of the outer nozzle 46. At this time, since the discharge side of the inner nozzle 45 communicates with an internal space of the pot 41, saturated steam generated in the pot 41, which is led to the opening 46a side of the outer nozzle 46, is discharged from the opening 46a of the outer nozzle 46 together with steam discharged from the opening 45b of the inner nozzle 45. That is, saturated steam with a temperature of 100° C. and a pressure of 1 atm. (i.e., 1013.25 hPa), which is generated by boiling water in the pot 41, is sucked into a circulating airflow that passes the external circulation passage 60 (shown in FIG. 3). By the structure of the steam suction ejector 44, saturated steam is immediately sucked up. Since no pressure is applied in the steam generator 40, discharge of saturated steam is not hindered.

Next, a control block diagram of the steam cooker 1 shown in FIG. 6 will be described.

Figure 6:
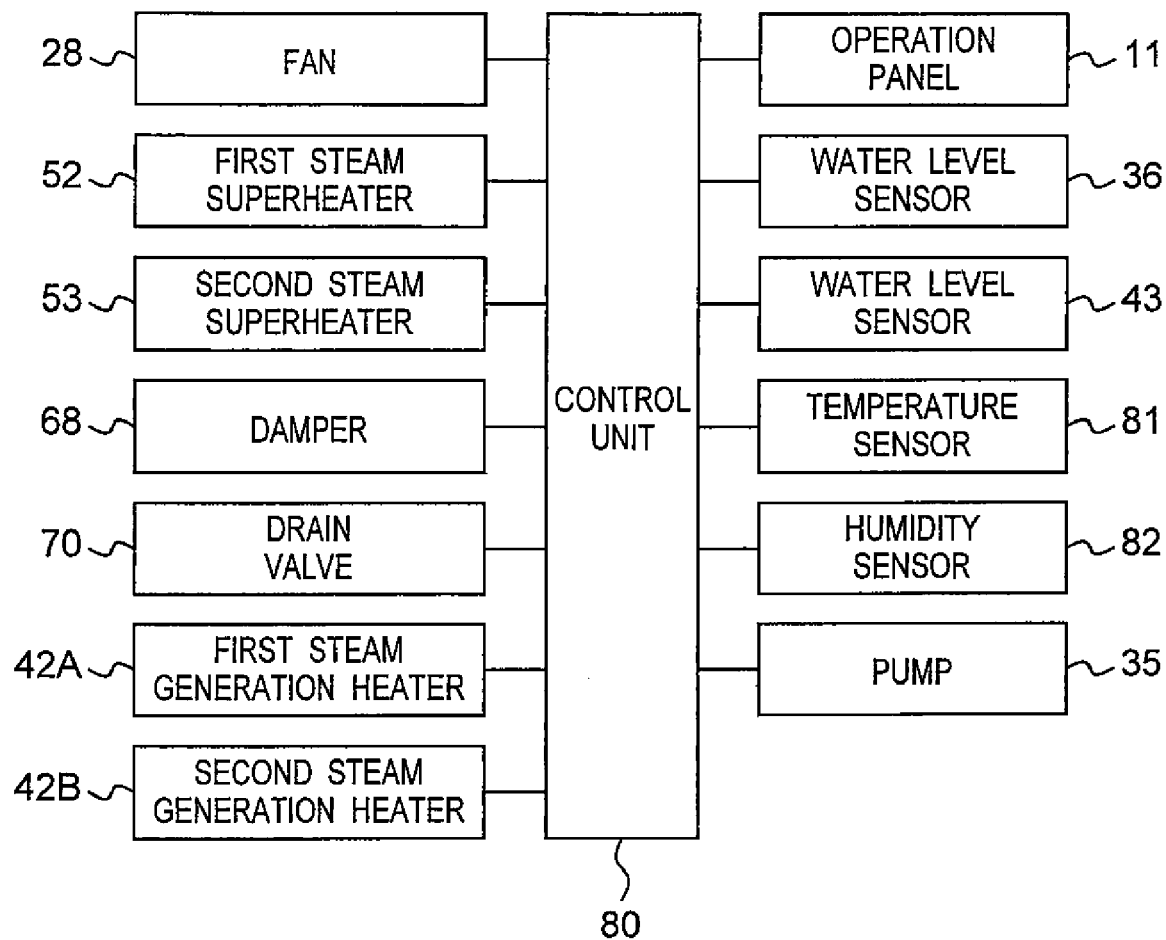
FIG. 6 is a control block diagram of the steam cooker.

As shown in FIG. 6, connected to the control unit 80 are the blower fan 28, the first steam superheater 52, the second steam superheater 53, the damper 68, the drain valve 70, the first steam generation heater 42A, the second steam generation heater 42B, the operation panel 11, the water level sensor 36 for the water tank, the water level sensor 43, a temperature sensor 81 for detecting a temperature in the heating chamber 20 (shown in FIG. 3), a humidity sensor 82 for detecting a humidity in the heating chamber 20, and the pump 35.

The control unit 80 has a microcomputer and an input/output circuit. Based on detection signals received from the water level sensor 36 for the water tank, the water level sensor 43, the temperature sensor 81, and the humidity sensor 82, the control unit 80 controls the blower fan 28, the first steam superheater 52, the second steam superheater 53, the damper 68, the drain valve 70, the first steam generation heater 42A, the second steam generation heater 42B, the operation panel 11, and the pump 35 in accordance with a predetermined program.

In the steam cooker 1 with the above construction, a power switch (not shown) on the operation panel 11 is pushed to power up, and a cooking operation is started by an operation of the operation panel 11. Then, the control unit 80 first closes the drain valve 70, and starts to operate the pump 35 in a state in which the exhaust gas passage 67 is closed by the damper 68. Water is supplied by the pump 35 from the water tank 30 into the pot 41 of the steam generator 40 via the first through fourth water supply pipes 31-34. Then, when the water level sensor 43 detects that the water level in the pot 41 has reached a predetermined level, the control unit 80 stops the pump 35 to stop water supply.

Next, the first and second steam generation heaters 42A, 42B are turned on, and a predetermined amount of water stored in the pot 41 is heated by the first and second steam generation heaters 42A, 42B.

Subsequently, simultaneously with turn-on of the first and second steam generation heaters 42A, 42B, or when the water temperature in the pot 41 has reached a predetermined temperature, the blower fan 28 is turned on, and, at the same time, the first steam superheater 52 is turned on. Then, the blower fan 28 sucks air (including steam) in the heating chamber 20 through the intake openings 25 and sends the air (including steam) to the external circulation passage 60. Since a centrifugal fan is used as the blower fan 28, it is possible to generate a higher pressure than with a propeller fan. Furthermore, the centrifugal fan used as the blower fan 28 is rotated at a high speed by a DC motor, whereby a flow rate of the circulating airflow can be highly increased.

Next, when water in the pot 41 of the steam generator 40 boils, saturated steam is generated. The generated saturated steam merges into the circulating airflow that goes through the external circulation passage 60, at the steam suction ejector 44. Steam ejected from the steam suction ejector 44 flows into the steam temperature-raising device 50 at a high speed via the third pipe 63.

Steam flowing into the steam temperature-raising device 50 is heated by the first steam superheater 52 to be superheated steam of about 300° C. (which varies depending on the type of cooking). A part of the superheated steam is jetted downward into the heating chamber 20 from the plurality of ceiling steam outlets 55 provided in the lower ceiling panel 54. Another part of the superheated steam is jetted from the side steam outlets 22 in both of the lateral sides of the heating chamber 20 via the steam supply passages 23, which extend to the left and right sides of the steam temperature heating device 50.

Thereby, superheated steam jetted from the ceiling side of the heating chamber 20 is vigorously supplied to the object 90 side. Also, superheated steam jetted from the left and right lateral sides of the heating chamber 20 is supplied in a manner so as to wrap the object 90, while going up from the lower side of the object 90, after colliding with the catch pan 21. Thereby, a convective superheated steam flow, in which steam blows down into a central portion and ascends in its outer side, is generated in the heating chamber 20. The convective superheated steam flow repeats a cycle of being sucked into the intake openings 25, passing the external circulation passage 60 and returning to the inside of the heating chamber 20 again.

In this manner, by forming a convective superheated steam flow in the heating chamber 20, it becomes possible to jet superheated steam, which is sent from the steam temperature-raising device 50, from the ceiling steam outlets 55 and the side steam outlets 22 so that it efficiently collides with the object 90, while maintaining uniform temperature, humidity distribution in the heating chamber 20. Then, collision of superheated steam heats the object 90. At this time, superheated steam in contact with a surface of the object 90 heats the object 90 also by releasing latent heat that is generated when building up condensation on the surface of the object 90. Thereby, a large quantity of heat can uniformly be imparted to the entire surface of the object 90 surely and promptly. Therefore, uniform cooking that secures a good finish can be realized.

In the cooking operation, an amount of steam in the heating chamber 20 increases with a lapse of time, and an excess amount of steam is discharged from the exhaust gas outlet 66 via the discharge port 27, the discharge passage 64 and the exhaust gas duct 65. At this time, a radiator 69 provided on the discharge passage 64 cools steam passing the discharge passage 64 to form condensation, whereby steam is prevented from being discharged to the outside as such. Water condensed by the radiator 69 within the discharge passage 64 runs down the discharge passage 64, is led to the catch pan 21, and disposed of together with water generated by cooking after completion of the cooking.

After completion of the cooking, the control unit 80 displays a message of completion of the cooking on the operation panel 11, and a sound is raised by a buzzer (not shown) provided on the operation panel 11. Thereby, a user who has noticed completion of the cooking opens the door 12. Then, the control unit 80 opens the damper 68 immediately after a sensor (not shown) detects opening of the door 12. Thereby, the first pipe 61 of the external circulation passage 60 communicates with the exhaust gas duct 65 via the exhaust gas passage 67, so that steam in the heating chamber 20 is discharged by the fan 28 from the exhaust gas outlet 66 via the intake openings 25, the first pipe 61, the exhaust gas passage 67 and the exhaust gas duct 65. The operation of the damper is the same even if the user opens the door 12 while cooking. Therefore, the user can safely take out the object 90 from the inside of the heating chamber 20 without being exposed to steam.

The heater 42 is placed in the vicinity of the bottom portion 41b in the pot 41 of the steam generator 40 as well as roughly on the same level, whereby the water level of water supplied into the pot 41 can be set to a range from the bottom portion 41b of the pot 41 to a little above the upper side of the heater 42. Therefore, by setting the water level in the pot 41 to a range from the bottom portion 41b of the pot 41 to a little above the upper side of the heater 42, and making the water level as low as possible, the amount of water in the pot 41, which is heated by the heater 42, can be made as small as possible, and start of steam generation by the steam generator 40 can be quickened. By quickening the start of steam generation by the steam generator 40, the start of superheated steam generation can be quickened, so that time required for cooking can be reduced. In particular, in cooking for the first time after stopping the operation for a long time, start of generation of superheated steam supplied into the heating chamber 20 can be quickened without requiring preheating while it is stopped. Thus, an effect of reducing the cooking time is noticeable.

The heater 42 is placed in the pot 41 whose planar shape is an elongated shape (a roughly rectangular shape in this embodiment), and the sheath heaters (42A, 42B) used as the heater 42 are placed in a manner so as to be along the sidewalls of the pot 41, whereby an area taken up by a region surrounded by an outer edge of the heater 42 is reduced, thus making it possible to increase heater power relative to a floor area (or an area at the water level) taken up by the heater in the pot 41, as well as possible to reduce a planar area of the pot 41. Therefore, by increasing the heater power relative to the floor area (or the area at the water level) taken up by the heater in the pot 41, and reducing the planar area of the pot 41 so that the amount of water is reduced, the steam generation by the steam generator 40 can be quickened more.

In the first steam generation heater 42A that is a U-shaped sheath heater having a larger pipe size and the second steam generation heater 42B that is a U-shaped sheath heater having a smaller pipe size, which is placed inside the first generation heater 42A and roughly at the same level as the first generation heater 42A, the radius of curvature of the curved portion 42Ba is made to be the minimum. The radius of curvature is determined by the pipe size of the sheath heater and the like. Then, if the power is applied to the heater in the same condition, the area taken up by the region surrounded by the outer edge of the heater 42 can be reduced so that the heater power relative to the area (or the area at the water level) taken up by the heater in the pot 41 is made highest. By making the heater power relative to the area (or the area at the water level) taken up by the heater in the pot 41 high, start of steam generation by the steam generator can be quickened more. Energization of the first steam generation heater 42A having a high power (700 W) and energization of the second steam generation heater 42B having a low power (300 W) is switched by the control unit 80, thereby making it possible to control the power applied for steam generation depending on a combination of the heaters. This enables the generation of steam depending on the type of cooking.

In the steam cooker 1 of the above embodiment, as shown in FIG. 4, the partition plate 47 for separating the water level sensor 43 from the heater 42 is placed in the pot 41, whereby air bubbles generated at the time of steam generation do not enter the inside of the partition plate 47. Even if the water level in the pot 41 is lowered below a position at which the water level sensor 43 is attached, air bubbles generated are not brought into contact with the water level sensor 43, so that erroneous detection of the water level sensor 43 due to air bubbles generated can be prevented and thus the water level in the pot 41 can accurately be grasped. Therefore, the control unit 80 controls the pump 35 and the heater 42 based on the detection results of the water level sensor 43 so as to be able to prevent boil-dry conditions as well as minimize the amount of water in the pot 41, which is to be heated by the heater 42 based on the detection results of the water level sensor 43. Therefore, the start of steam generation by the steam generator 40 is quickened.

Quickening the steam generation by the steam generator 40 in turn accelerates the start of generation of superheated steam that is supplied to the heating chamber, so that cooking time is reduced.

Figure 8:
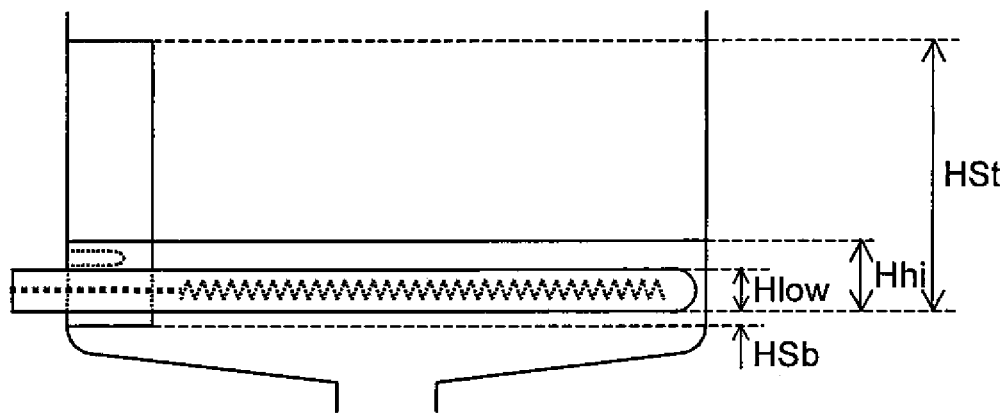
FIG. 8 is a schematic view for explaining a partition plate in the pot.

FIG. 8 shows a schematic view for explaining the partition plate in the pot. In FIG. 8, Hst indicates a distance from the lowermost portion, or the bottom, of the heater 42 to an upper end of the partition plate 47, Hhi indicates a distance from the lowermost portion of the heater 42 to a maximum water level, or a higher limit of the water level, Hlow indicates a water level from the lowermost portion of the heater 42 at which level the water level sensor 43 decides that there is no water, and Hsb indicates a distance from the lowermost portion of the heater 42a to a lower end of the partition plate 47.

The distance Hst from the lowermost portion of the heater 42 to the upper end of the partition plate 47 is set to about twice or more as large as the distance Hhi from the lowermost portion of the heater 42 to the maximum water level. Therefore, air bubbles generated in the pot 41 at the time of the steam generation would not reach the upper end of the partition plate 47, so that air bubbles are prevented from crossing over the partition plate 47 and entering the inside of the partition plate 47 toward the water level sensor 43. Therefore, it is possible to surely prevent an erroneous detection of the water level sensor 43, which is attributable to air bubbles generated.

The distance HSb from the lowermost portion of the heater 42 to the lower end of the partition plate 47 is secured, namely, the lower end of the partition plate 47 of the steam generator 40 is located below the lowermost portion of the heater 42 in the pot 41. Therefore, air bubbles generated in the pot 41 at the time of steam generation would not reach the lower end of the partition plate 47, so that air bubbles are prevented from entering the inside of the partition plate 47 toward the water level sensor 43. As a result of this as well, it is possible to surely prevent an erroneous detection of the water level sensor 43, which is attributable to air bubbles generated at the time of steam generation.

Figure 9:
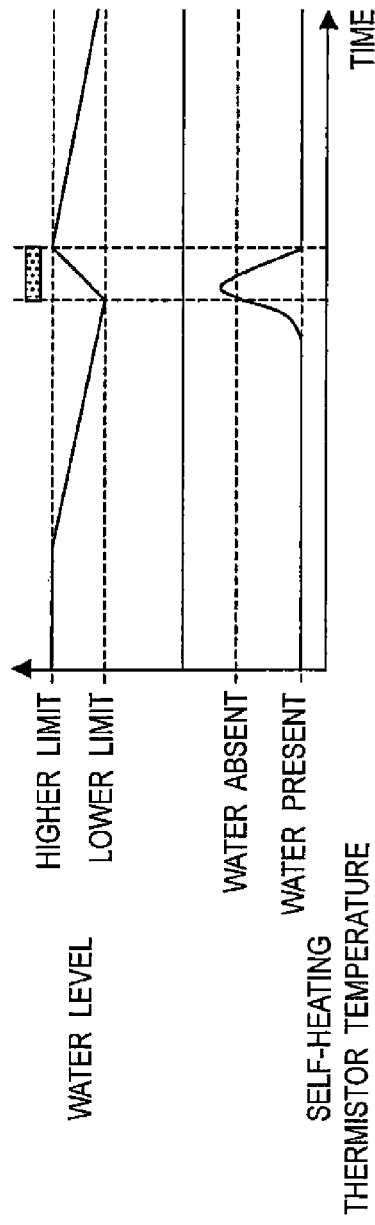
FIG. 9($a$) shows changes of a water level and a temperature of a self-heating thermistor when air bubbles do not touch the water level sensor, while FIG. 9($b$) shows changes of a water level and a temperature of the self-heating thermistor when air bubbles touch the water level sensor.
Figure 9:
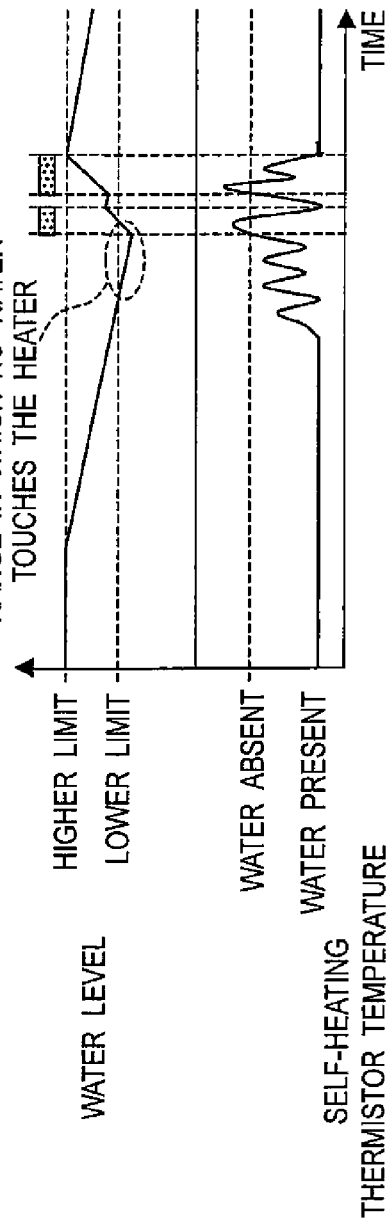

FIG. 9(a) shows changes of a water level and a temperature of the self-heating thermistor when air bubbles do not touch the water level sensor 43, while FIG. 9(b) shows changes of a water level and a temperature of the self-heating thermistor when air bubbles touch the water level sensor 43. Due to the placement of the partition plate 47 in the pot 41 so that air bubbles do not touch the water level sensor 43, when the water level reaches a lower limit, the temperature of the self-heating thermistor is increased to reach a value indicating the absence of water, as shown in FIG. 9(a). Then, the pump 35 (shown in FIG. 3) is operated to supply water into the pot 41, and when the water level reaches a higher limit, the temperature of the self-heating thermistor reaches a value indicating the presence of water. In contrast, if there is no partition plate, despite the water level where water does not splash on the water level sensor 43, air bubbles touch the water level sensor 43. Thus, as shown in FIG. 9(b), the temperature of the self-heating thermistor becomes erratic, so that water supply cannot appropriately be achieved.

Due to the placement of the partition plate 47 of the steam generator 40 in the pot 41 so as to be spaced from the water level sensor 43, when the water level is lowered below the water level sensor 43, there is no attachment of water drops between a surface of the water level sensor 43 and an inner surface of the partition plate 47 due to surface tension, so that an erroneous detection of the water level sensor 43 can surely be prevented.

Figure 10:
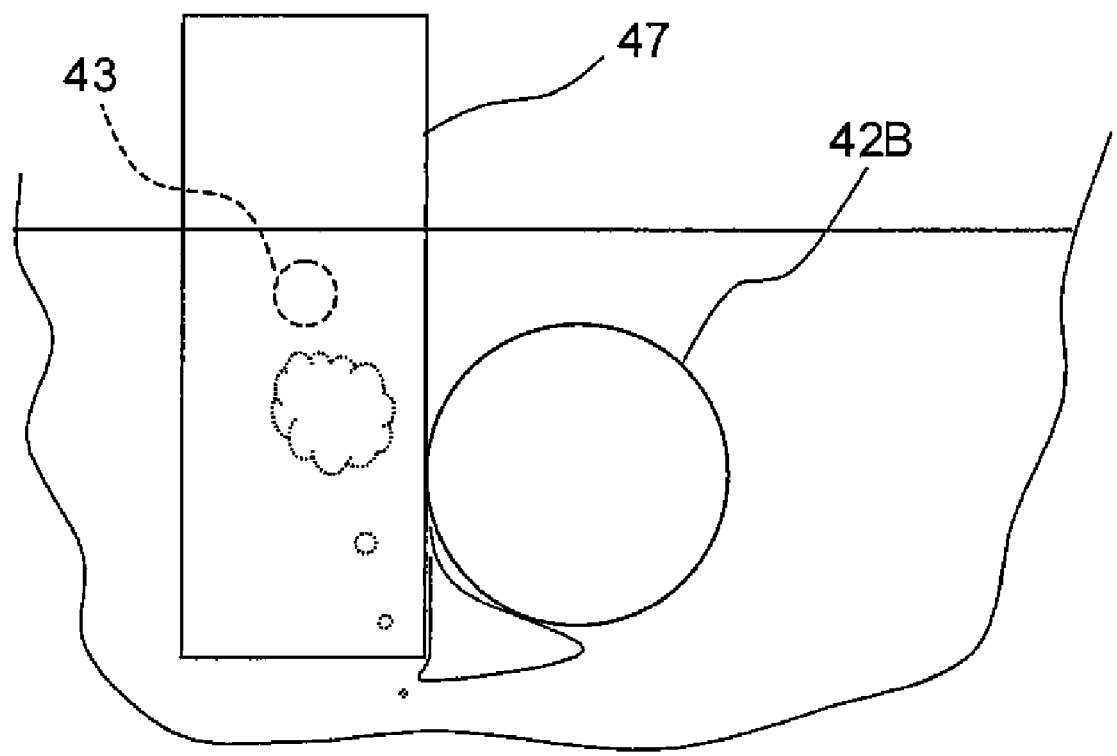
FIG. 10 is a schematic view showing a state in which a second steam generation heater is in contact with the partition plate in the pot.

Due to the placement of the heater 42 of the steam generator 40 in the pot 41 in a spaced manner from the partition plate 47, it is possible to prevent air bubbles generated at the time of steam generation from entering the inside of the partition plate 47 from the lower side of the partition plate 47, which might occur if, as shown in FIG. 10, the heater (42B in FIG. 10) is in contact with an outer surface of the partition plate 47, in which case air bubbles getting larger between the heater (42B) and the partition plate 47 would enter the inside of the partition plate 47. Due to this feature as well, it is possible to surely prevent an erroneous detection of the water level sensor 43 attributable to air bubbles generated at the time of steam generation.

In the steam cooker 1 of the above embodiment, the water level in the pot 41 is set to a little higher position than that of the upper side of the heater 42, so that the amount of water to be contained in the pot 41 can be minimized. However, in the case where the body of this steam cooker 1 is tilted and the pot 41 is thus tilted, the heater 42 may be exposed upward from the water surface. In such a case, heat emitted from the heater cannot efficiently be used, so that the start of steam generation is also delayed. Consequently, in the steam cooker 1, by placing in the pot 41 the water level sensor 43 and the temperature sensor 48 serving as one example of state judging devices for judging the exposed state of the heater 42, the exposed state of the heater 42 from the water in the pot 41 is judged.

For example, in the case where, due to tilt of the pot 41 at the time of steam generation, the water level sensor 43 side is lowered and the temperature sensor 48 side is elevated so that the water level sensor 43 is under the water and the temperature sensor 48 is in the air, the temperature detected by the water level sensor 43 will be about 100° C., while the temperature detected by the temperature sensor 48 will be 100° C. or more because it is heated by the heater 42. This shows the tilt of the pot 41 as well as a state in which the temperature sensor 48 side of the heater 42 is exposed from the water surface. On the other hand, in the case where, due to tilt of the pot 41 at the time of steam generation, the water level sensor 43 side is elevated and the temperature sensor 48 side is lowered so that the water level sensor 43 is in the air and the temperature sensor 48 is under the water, the water level sensor 43 will detect a temperature at which it is decided that there is no water, and the temperature sensor 48 will detect a temperature of 100° C. or less. This shows the tilt of the pot 41 as well as a state in which the water level sensor 43 side of the heater 42 is exposed from the water surface.

Based on the judgment results using the temperatures detected by the water level sensor 43 and the temperature sensor 48, the control unit 80 controls the pump 35 so as to keep the water level in the pot 41 without exposing the heater 42 from the water surface in the pot 41. Therefore, even if the installation site does not have a horizontal surface and the pot is tilted to some extent as in general home kitchens, the amount of water in the pot 41, which is to be heated by the heater 42, can be made as small as possible without exposing the heater 42 from the water surface, so that the start of steam generation by the steam generator 40 can be quickened. Furthermore, applying a thermal stress to peripheral members due to an increase in the temperature of the heater 42 exposed from the water surface can be avoided.

As a result of the quickened start of steam generation by the steam generator, the start of the generation of superheated steam to be supplied to the heating chamber 20 is also quickened. This can reduce cooking time.

Further, the water level sensor 43 and the temperature sensor 48 serving as one example of the state judging devices are placed at opposed side surfaces in the pot 41 whose planar shape (i.e., shape in plan view) is generally an elongated rectangle, whereby a tilt of the pot 41 along a perpendicular plane including a straight line. connecting the water level sensor 43 and the temperature sensor 48 can be detected. Furthermore, since the water level sensor 43 and the temperature sensor 48 are placed at the opposed side surfaces that are the short sides of the pot 41, the straight line connecting the water level sensor 43 and the temperature sensor 48 corresponds to a longitudinal direction of the pot 41. Thus, it is possible to detect the tilt of the pot 41 along the perpendicular plane including the straight line, namely, the tilt of the pot 41 which is a greatest factor causing the exposure of the heater 42 from the water surface.

The water level sensor 43 as one of the state judging devices for judging the exposed state of the heater 42 can be used for both detecting the water level in the pot 41 and judging the exposed state of the heater 42 (namely, the tilt of the pot), so that the construction can be simplified.

The self-heating thermistor used as the water level sensor 43 detects the water level utilizing a difference in heat radiation coefficient between in the water and in the air. Thus, unlike a float type water level sensor, the water level sensor 43 has a simple structure with no movable portion and thus can accurately detect the water level.

In the steam cooker 1 of the embodiment, the water level sensor 43 detects the temperature (steam temperature) not only in the water but also in the air at the time of steam generation. Thus, the temperature sensor 48 for detecting a water temperature is used in combination with the water level sensor 43, and the presence or absence of water is judged based on a detection temperature detected by the water level sensor, or self-heating thermistor, and the water temperature detected by the temperature sensor 48.

Figure 11:
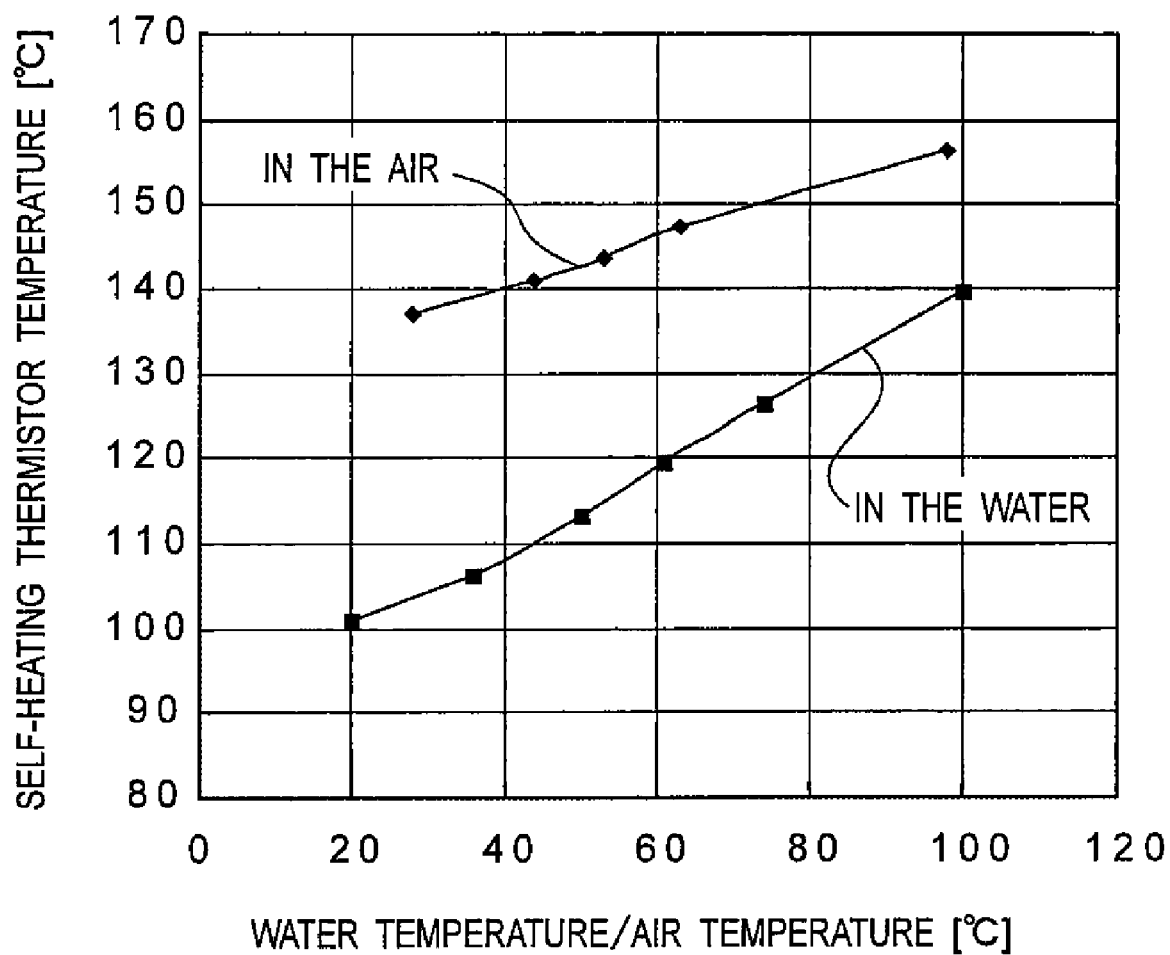
FIG. 11 is a view showing a relationship between a water temperature detected by a temperature sensor and a temperature detected by the self-heating thermistor that is a water level sensor.

FIG. 11 shows a relationship between a water temperature detected by the temperature sensor 48 and a temperature detected by the self-heating thermistor that is the water level sensor 43. In FIG. 11, the axis of abscissas represents a water temperature/air temperature [° C.] detected by the temperature sensor 48, while the axis of ordinates represents a temperature [° C.] detected by the self-heating thermistor of the water level sensor 43.

As shown in FIG. 11, the temperature detected by the self-heating thermistor of the water level sensor 43 gradually increases in both in the water and in the air together with an increase in the water temperature/air temperature detected by the temperature sensor 48. Based on the water temperature (ambient temperature) detected by the temperature sensor 48, the control unit 80 determines a reference value for discriminating whether the temperature detected by the self-heating thermistor that is the water level sensor 43 is a temperature in the water or a temperature in the air. Judging the temperature detected by the self-heating thermistor, or water level sensor 43, based on the reference value, the control unit 80 judges whether the water level sensor 43 is in the water or in the air.

Although sheath heaters are used in the above embodiment, other types of heaters such as cartridge heaters having a heating planar surface may be used.

The above embodiment uses the heater 42 having the first steam generation heater 42A that is a U-shaped sheath heater having a larger pipe size and the second steam generation heater 42B that is a U-shaped sheath heater having a smaller pipe size, which is placed inside the first steam generation heater 42A. The shape of the heaters is, however, not limited to this and any shape may be used. However, they are preferably placed roughly on the same horizontal plane in the vicinity of the bottom portion in the pot.

Figure 7:
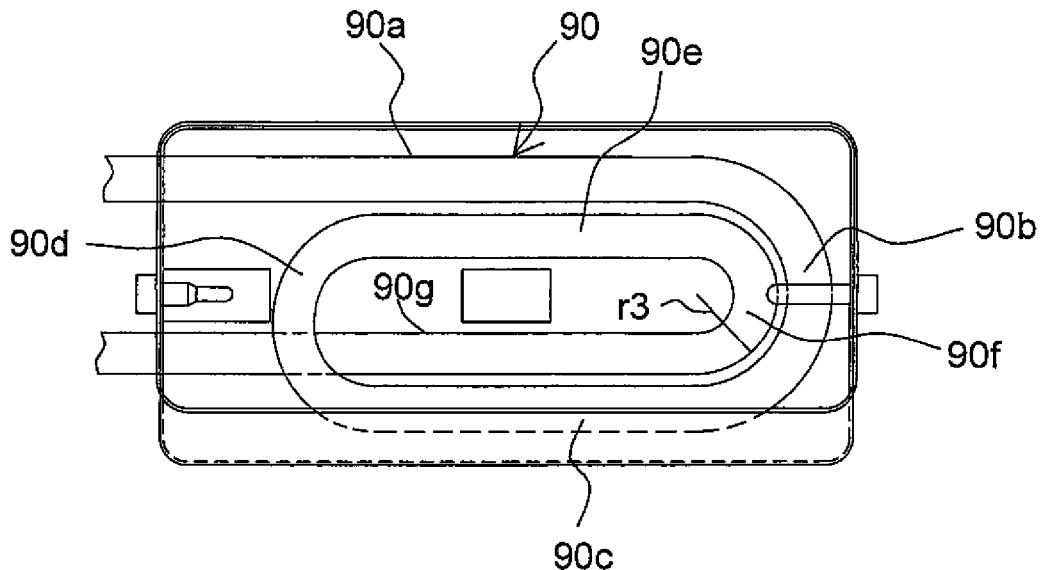
FIG. 7 is a plan view of the pot of the steam generator using another heater.

For example, the heater may take a shape such as a heater 90 shown in FIG. 7. As shown in FIG. 7, this heater 90 is a sheath heater having a linear portion 90a, a semicircular arc shaped curved portion 90b, a linear portion 90c, a semicircular arc shaped curved portion 90d, a linear portion 90e, a semicircular arc shaped curved portion 90f having a smaller radius of curvature than those of the curved portions 90b, 90d, and a linear portion 90g. The radius of curvature r3 of the semicircular arc shaped curved portion 90f located on the inner side is set to a minimum radius of curvature of the sheath heater. In this case, although a part of the linear portion 90g is positioned under the curved portion 90d, what is required is that major portions of the heater 90 are placed roughly on one horizontal plane.

The invention claimed is:

1. A steam generator, comprising:
a pot to which water is supplied;
a heater placed in the pot;
a water level sensor that detects a level of the water contained in the pot;
a temperature sensor that detects a temperature inside the pot; and
a controller that controls an amount of water in the pot based on an output from the water level sensor and an output from the temperature sensor so as to maintain the heater submerged in the water,
wherein the water level sensor is a self-heating thermistor, and
wherein the controller judges whether the heater is submerged in the water or not by obtaining a reference value based on the output from the temperature sensor and comparing the output from the water level sensor with the reference value.

2. The steam generator according to claim 1, wherein the pot has a planar shape of generally an elongated rectangle, and
the water level sensor and the temperature sensor are placed at opposed side surfaces in the pot.

3. The steam generator according to claim 2, wherein the opposed side surfaces in the pot at which the water level sensor and the temperature sensor are placed correspond to short sides of the elongated rectangle of the pot.

4. The steam generator according to claim 1, wherein the steam generator is provided in a steam cooker, the steam cooker including,
- a steam temperature-raising device for raising a temperature of steam coming from the steam generator, and
- a heating chamber in which an object to be cooked is heated by steam supplied from the steam temperature-raising device.

5. The steam generator according to claim 1, further comprising:
- a pump that supplies water into the pot,
- wherein the controller operates that pump when the controller determines that the level of the water is below the heater.

6. The steam generator according to claim 1, further comprising:
- a partition plate disposed between the water level sensor and the heater to prevent water bubbles generated by the heater from making contact with the water level sensor.

7. The steam generator according to claim 6, wherein
the partition plate defines a space for accommodating the water level sensor while allowing the water in the pot to enter into the space.

8. The steam generator according to claim 6, wherein
the partition plate is spaced apart from the heater.

9. The steam generator according to claim 1, wherein
the controller determines that the pot has been tilted based on the output from the water level sensor and the output from the temperature sensor.

10. The steam generator according to claim 1, wherein
the heater has substantially flat configuration and placed horizontally inside the pot, and at least one of the water level sensor and the temperature sensor is disposed above an upper surface of the heater.

11. A steam cooker, comprising:
the steam generator according to claim 1;
a steam temperature-raising device for raising a temperature of steam coming from the steam generator; and
a heating chamber in which an object to be cooked is heated by steam supplied from the steam temperature raising device.

12. The steam generator according to claim 1, wherein
the water level sensor is provided at a position higher than the heater;
the temperature sensor is provided at a height substantially the same as the water level sensor with respect to the heater;
the reference value is used to judge whether the temperature detected by the self-heating thermistor that is the water-level sensor is a temperature of the water or a temperature of the air; and
the controller controls the amount of water in the pot based on a result of the judgment using the reference value so as to maintain the water level sensor and the temperature sensor submerged in the water.

* * * * *